United States Patent [19]

Landau

[11] Patent Number: 5,419,978
[45] Date of Patent: May 30, 1995

[54] PHOSPHORIC ACID FUEL CELL PASSIVATION WITH NATURAL GAS

[75] Inventor: Michael B. Landau, West Hartford, Conn.

[73] Assignee: International Fuel Cells Corporation, S. Windsor, Conn.

[21] Appl. No.: 214,410

[22] Filed: Mar. 17, 1994

[51] Int. Cl.⁶ .............................................. H01M 8/06
[52] U.S. Cl. ...................................... 429/13; 429/17; 429/18; 429/19; 429/20; 429/22
[58] Field of Search ....................... 429/13, 17, 20, 18, 429/19, 22

[56] References Cited

U.S. PATENT DOCUMENTS

| | | | |
|---|---|---|---|
| 4,657,826 | 4/1987 | Tajima | 429/12 |
| 4,963,443 | 10/1990 | Kamoshita | 429/17 |
| 5,013,617 | 5/1991 | Scheffler | 429/17 |

*Primary Examiner*—Prince Willis, Jr.
*Assistant Examiner*—M. Nuzzolillo

[57] ABSTRACT

The anodes of fuel cells in a fuel cell stack are passivated during no load, hot-hold periods by directing a stream of desulfurized natural gas through the anode side of the cells in the stack. The cell voltage is thus maintained below 800 millivolts, preferably between 300 and 500 millivolts, during such periods.

6 Claims, 1 Drawing Sheet

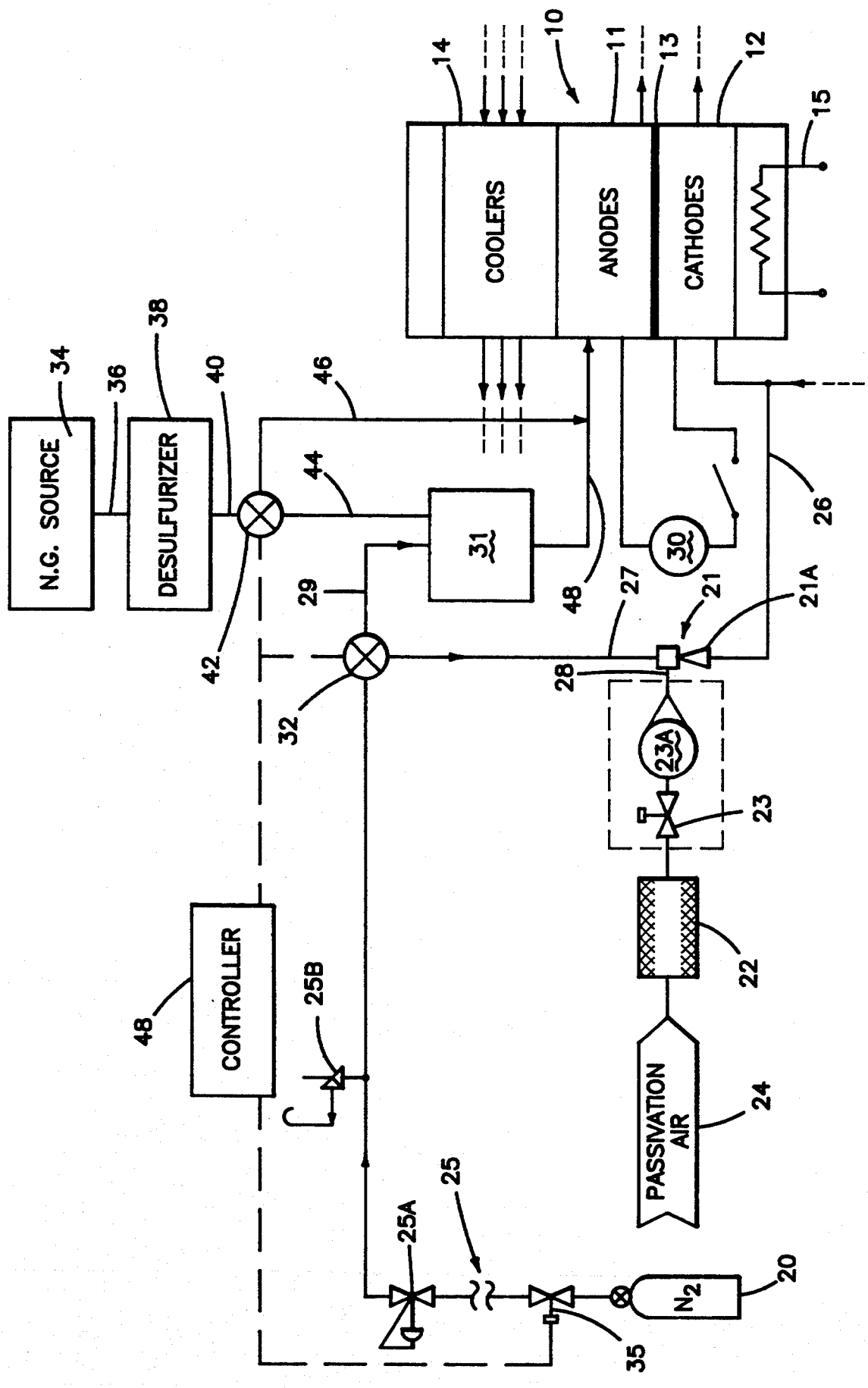

PHOSPHORIC ACID FUEL CELL PASSIVATION WITH NATURAL GAS

TECHNICAL FIELD

This invention relates to a method and system for passivating the anodes of fuel cells in a fuel cell stack during no load, hot-hold operating periods of the stack. More particularly, this invention relates to the passivation of fuel cell anodes with desulfurized natural gas.

BACKGROUND ART

During no load, hot-hold periods of operation of fuel cell stacks, there is a need to control potentials in the stack anodes and cathodes. If the electrical potential in the cells of a stack of, for example, phosphoric acid fuel cells is allowed to exceed certain limits, on the order of about 0.8 volts, the electrodes of the fuel cells can be damaged due to corrosion. Such electrical potential control is needed during off-power or non-operating periods, during power plant shutdown, start-up, and hot-holds.

U.S. Pat. No. 5,013,617 granted May 7, 1991 to G. W. Scheffler discloses a method and system for purging fuel cell stack components, and for passivating the anodes and cathodes of the cells in a fuel cell stack during hot, no load periods. The aforesaid patent suggests the use of nitrogen gas to purge the reformer and anodes, and the use of a mixture of oxygen and nitrogen gas to purge the cathodes. After the initial purging operation, the anodes are passivated by a stream of nitrogen gas, and the cathodes are passivated by a stream of a mixture of oxygen and nitrogen. U.S. Pat. No. 5,013,617 is hereby incorporated herein in its entirety. Fuel cell anodes can also be passivated by a stream of hydrogen gas. This latter solution to the passivation problem is not desirable due to the need to store the passivation hydrogen gas at the power plant sites.

DISCLOSURE OF THE INVENTION

This invention relates to a method and system for passivating fuel cell stack anodes during no load, hot hold periods, which method and system use the natural gas fuel supply for the power plant. All phosphoric acid fuel cell power plants use a source of hydrogen, typically natural gas which is principally methane, and a source of oxygen, which is typically air. The hydrogen source is directed through the stack anodes, and the oxygen source is directed through the stack cathodes. The natural gas stream will be fed through a steam reformer assembly which renders it suitable for use in the stack anodes. Deleterious components of the natural gas, such as sulfur, are removed by desulfurizing beds, before the gas is fed from the reformer to the anodes.

In the system of this invention, essentially the same purge and cathode passivation procedures using nitrogen, and the nitrogen/oxygen mixtures described in the aforesaid patent are employed. After the reformer and anodes have been purged with nitrogen gas, the flow of nitrogen to the anodes is stopped, and a stream of desulfurized natural gas is fed through the anodes for passivating the latter. Since the natural gas source for operating the stack during power periods is also used to passivate the anodes during no load periods, the power plant requires fewer auxiliary gas components.

It is therefore an object of this invention to provide a method and system for passivating fuel cell power plant anodes in a phosphoric acid fuel cell stack during high temperature, no load periods of time.

It is a further object of this invention to provide a method and system of the character described which utilizes the power plant's source of natural gas to passivate the stack anodes.

It is an additional object of this invention to provide a method and system of the character described which purges the reformer and anodes with a supply of nitrogen gas, and purges and passivates the cathodes with a mixture of nitrogen and oxygen.

These and other objects and advantages of this invention will become more readily apparent from the following detailed description of a preferred embodiment of the invention when considered in connection with the accompanying drawing which is a schematic system diagram of a phosphoric acid fuel cell power plant which employs the passivation system and method of this invention.

BEST MODE FOR CARRYING OUT THE INVENTION

Referring now to the drawing, it is noted that the drawing shows in simplified form an exemplary fuel cell 10 with which the present invention can be used, which cell can represent, for example, a two hundred (200 kw) kilowatt phosphoric acid power plant unit.

As is known, a fuel cell 10 is an electrochemical cell, which consumes fuel and an oxidant on a continuous basis to generate electrical energy. The fuel is consumed at an anode section 11 and the oxidant at a cathode section 12. The anode and cathode sections 11 and 12 are placed in electrochemical communication by an appropriate electrolyte 13.

A typical fuel cell power plant comprises one or more stacks of fuel cells, the cells within each stack being connected electrically in series to raise the total voltage of the stack. A stack may be connected in parallel with other stacks to increase the current generating capability of the power plant. Depending upon the desired size of the power plant, a stack of fuel cells may comprise a half dozen cells or less, or as many as several hundred cells. Air and fuel are usually fed to the cells by one or more manifolds per stack.

As illustrated in the drawing, a cooler section 14 and an electrical heater 15 can be used in conjunction with the fuel cell 10.

One typical fuel cell employs a phosphoric acid electrolyte. The phosphoric acid fuel cell uses air to provide oxygen ($O_2$) as an oxidant to the cathode section 12 and uses a hydrogen rich stream to provide hydrogen ($H_2$) as a fuel to the anode section 11. After passing through the cell 10, the depleted air and fuel streams are vented from the system on a continuous basis.

As noted above the electrodes of such a fuel cell can be damaged if the electrical potentials exceed certain limits during low or no load periods of operation at elevated temperatures. As noted above such off-power conditions or non-operating modes occur, for example, during power plant shutdown, start-up and hot-holds.

A hot hold condition does not necessarily imply a no load operating condition. Small loads of 0.3 to 3.0 ASF are commonly utilized in our power plants.

It is desirable to maintain electrode potentials close to their operating high load operating conditions during power plant hot holds, shutdowns and start-ups. An acceptable range of electrode potentials for times other than high power operation includes the following:

anode as close as possible to 0.0 V and cathode 0.5 V to 0.8 V. These potentials are measured versus a hydrogen reference electrode.

Controlling both the reactant gases and the load on cells is therefore a way to maintain these operating potentials. These individual potentials then set a cell voltage but the important characteristics are the individual electrode potentials.

During power plant shutdown, the cathode section 12 is purged with a gaseous mixture of oxygen and nitrogen supplied from an ejector 21 bleeding in air using nitrogen ($N_2$) as the primary gas. The fuel gas reformer 31 is normally purged with nitrogen ($N_2$). The amount of $O_2$ in the purge gas must be maintained at a level which will provide the desired range of cathode potential noted above. This amount may vary depending on whether the stack is operating at minimum or no load levels.

As can be seen in the drawing, the nitrogen gas component is received from a storage tank 20. The outlet line from the tank 20 is fed through an interface 25 through a regulator 25A to the ejector line 27 and anode purge line 29. A pressure relief 25B is included in the nitrogen source line. Flow of nitrogen gas from the tank 20 is selectively controlled by a valve 35.

A "T" juncture at valve 32 is provided between the relatively high pressure nitrogen gas source 20 and the fuel cell 10. One branch 27 of the "T" juncture leads to the ejector 21 and eventually to the cathode section 12, and the other branch 29 leads to the reformer 31 and thence to the anode section 11 providing a purging gas source. Suitable control means, such as, for example, a valve 32 is provided to control the supply of the nitrogen gas to the line 27 and to the anode purge line 29. The valve 32 is a two-way valve which is operative, when in a first position, to direct the nitrogen gas flow from the tank 20 to both the injection line 27 and to the anode purge line 29. After anode and reformer purge has been completed, the valve 32 is moved to a second position wherein the nitrogen gas is only directed to the ejection line 27, so that the nitrogen gas can be used to passivate the cathode 12 after both electrodes and the reformer have been purged by the nitrogen gas.

In the ejector branch the nitrogen gas is mixed with ambient air in the ejector 21, after the ambient air 24 is filtered in filter 22, and the amount of air being injected is appropriated controlled by trim valve 23. The filter 22 and the orifice or metering valve 23A are added to the air inlet 28 of the ejector 21 to ensure a controlled addition of clean air to the nitrogen gas. The nitrogen/oxygen mixture then goes to the cathode section 12 of the cell stack 10 through mixed outlet line 26.

A hydrocarbon source 34, which constitutes a supply of natural gas, principally methane, provides the cell anodes 11 with a supply of hydrogen-rich gas through line 36. The natural gas passes through a desulfurizer 38 and into a line 40 which leads to a three-way valve 42. The valve 42 controls the path of travel of the desulfurized natural gas between a first line 44 which leads to the reformer 31, and a second line 46 which leads directly to the anode-inlet line 48.

When the fuel cell 10 is operating in a normal load-producing mode, the valve 42 will be disposed in a first position when the desulfurized natural gas will flow into the reformer 31 and thence to the anodes 11, via the line 48. When the anodes 11 and reformer 31 are being purged by the nitrogen gas stream, the valve 42 will be disposed in a second position wherein the natural gas stream will be prevented from entering either line 44 or 46. After the nitrogen gas purge step has been completed, the valve 42 will be disposed in a position which causes the desulfurized natural gas stream to flow into the line 46 and thence through the line 46 to the anodes 11. The cell voltage is thus maintained below 0.8 volts during the passivation period.

Selective operation of the several valves 32, 35 and 42 is controlled by a microprocessor power plant controller 48 which also controls overall operation of the power plant.

The following exemplary sequence of events are followed during, for example, a plant shut-down. The cathode section 12 is purged with the appropriate gas mix of nitrogen and oxygen gases. This gas mix is supplied from the ejector 21 bleeding in air using nitrogen gas as the primary gas and air as the dilute oxygen source.

The anode side is purged with the nitrogen gas through the anode purge line 29. This anode purge includes purging the reformer 31 and the anode section 11. After the anode and reformer purge is completed, the valves 32 and 42 are positioned so as to cut off flow of the nitrogen gas into line 29, while maintaining nitrogen gas flow through the line 27 to the cathodes 12; and to direct natural gas flow from line 40 into line 46.

It will be readily appreciated that this invention allows the use of the existing natural fuel gas source in fuel cell power plant as the supply of no load-hot hold anode passivation gas. Selective operation of the power plant for normal operation, purging operation, and passivation operation is readily achieved with the power plant microprocessor controller. The need for excessive peripheral gas storage tanks is minimized.

Since many changes and variations of the preferred embodiment of this invention may be made without departing from the inventive concept, it is not intended to limit the invention otherwise than as required by the appended claims.

What is claimed is:

1. A method of operating an acid electrolyte fuel cell stack during no load-hot hold periods, said method comprising the steps of:
   a) directing a stream of nitrogen gas through anode portions of said fuel cell stack to purge said anode portions; and
   b) subsequently directing a stream of natural gas through said anode portions during said periods so as to minimize electrical potential in said anode portions during said periods.

2. The method of claim 1 comprising the step of providing said stream of natural gas from a source thereof which serves as a fuel for said stack during normal load operating periods.

3. The method of claim 2 further comprising the step of desulfurizing the natural gas stream as it flows from said source to said anodes.

4. The method of claim 3 further comprising the steps of providing a natural gas reformer through which said natural gas stream flows during normal load operating periods and diverting said natural gas stream around said reformer so that said natural gas stream is non-reformed during said no load periods.

5. An acid electrolyte fuel cell stack passivating assembly for operating said stack at low electrical potential during hot hold, no load time periods, said stack assembly comprising:

a) a source of natural gas fuel reactant for electrode anodes in said stack;
b) reformer means for reforming a stream of natural gas from said source thereof during normal load operating periods; and
c) means for selectively directing the stream of natural gas through said reformer means and to said anodes during normal load operating periods; and for selectively diverting the natural gas stream around said reformer means and to said anodes during hot hold, no load periods.

6. The fuel cell stack assembly of claim 5 further comprising means for desulfurizing the natural gas stream during both said normal load and no load operating periods.

* * * * *